United States Patent Office 3,551,427
Patented Dec. 29, 1970

1

3,551,427
4-THIENYL-2-(1H)-QUINAZOLONES
Hans Ott, Pfeffingen, Basel-Land, Switzerland, assignor to Sandoz-Wander, Inc., Hanover, N.J., a corporation of Delaware
No Drawing. Continuation-in-part of application Ser. No. 637,637, May 11, 1967, which is a continuation-in-part of application Ser. No. 595,639, Nov. 21, 1966. This application May 9, 1969, Ser. No. 823,500
Int. Cl. C07d 51/48
U.S. Cl. 260—251
16 Claims

ABSTRACT OF THE DISCLOSURE

Compounds of the class of 4-thienyl-2(1H)-quinazolones, e.g., 1-methyl-4-(2-thienyl)-2(1H)-quinazolone, which are useful as anti-inflammatory agents.

This application is a continuation-in-part of copending application Ser. No. 637,637, filed May 11, 1967 which in turn is a continuation-in-part of application Ser. No. 595,639, filed Nov. 21, 1966, both of which are now abandoned.

This invention relates to bicyclic compounds. In particular, the invention pertains to 2(1H)-quinazolones substituted in the 4-position by a thienyl group, and methods of preparing the same. The invention also relates to intermediates which are useful in the preparation of the above compounds and to processes for preparing said intermediates.

The quinazolones of the present invention may be represented structurally as follows:

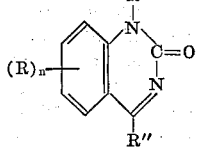

wherein

R is, independently, hydrogen; halo, preferably having an atomic weight no greater than 80, e.g. chloro; lower alkyl of 1 to 5 carbon atoms, e.g. methyl; and lower alkoxy of 1 to 5 carbon atoms, e.g. methoxy;
$n$ is 1 or 2;
R' is lower alkyl, preferably containing from 1 to 5 carbon atoms, e.g. methyl, ethyl, propyl and isopropyl; allyl or propargyl;
R'' is

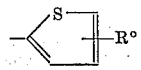

and
R° is hydrogen, halo of atomic weight not exceeding 36, or lower alkyl, preferably containing from 1 to 4 carbon atoms, e.g., methyl, ethyl, propyl and butyl.

The compounds of structural Formula I can be prepared by reacting 2-(o-aminobenzoyl)thiophene or an appropriately substituted derivative thereof of Formula II with urea to form the corresponding 4-(2-thienyl)-2(1H)quinazolone of Formula III and then treating an alkali metal salt of the latter with an appropriate halide

2

(R'X) to obtain compounds of Formula I–A. These processes may be illustrated by the following reaction scheme:

Reaction scheme I

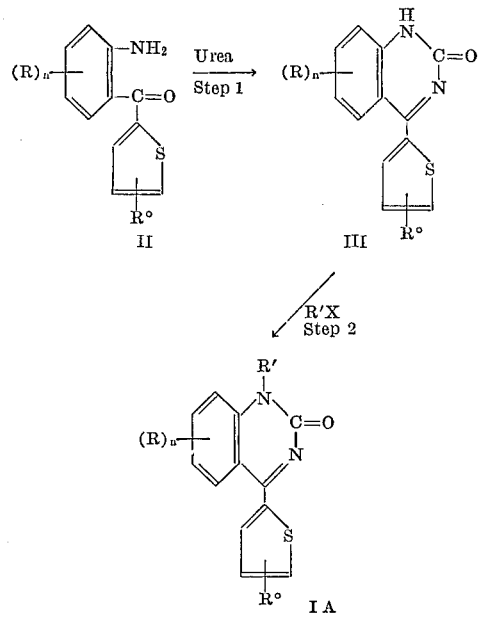

wherein R, $n$, R' and R° are as previously defined and X represents halo, preferably iodo.

In Step 1 of the above process the 2-(o-aminobenzoyl)-thiophene (II) is reacted with urea to form the corresponding quinazolone (III). This reaction is conveniently effected at an elevated temperature greater than the melting point of urea. Preferably, the reaction temperature is in the range of from about 180° C. to about 200° C. The reaction can be carried out in the presence of an inert organic solvent. However, the use of a solvent is not necessary since an excess of urea can be employed for this purpose.

The reaction time will, of course, vary depending upon the particular conditions employed. However, in general, the reaction is completed within 30 minutes to 2 hours. The resulting quinazolone (III) is readily recovered in conventional manner.

In Step 2 of the process the quinazolone (III) in the form of an alkali metal salt, e.g., 1-sodio or 1-potassio derivative, is treated with an appropriate halide to form the corresponding 1-substituted derivative of structural Formula IA. The preparation of the quinazolone salt is carried out in the usual manner employing any of the conventional agents commonly used for this purpose, e.g., sodium hydride and the alkali metal alkoxides such as sodium methoxide, sodium ethoxide, potassium methoxide and potassium ethoxide. The formation of the salt; preferably the sodium or potassium salt, is conveniently effected in a suitable inert organic solvent, e.g., dimethylacetamide, diethylacetamide, dimethylformamide, dimethylsulfoxide and dioxane, and at room temperature. The resulting salt is then converted to the desired compound of Formula IA by treatment with an appropriate halide, preferably an iodide. This reaction is preferably carried out in the same solvent employed to prepare the quinazolone salt. However, if desired, the salt can be isolated and then treated with the halide. The reaction can be carried out at room temperature (20° C.) or at elevated temperatures up to about 80° C. The reaction time will vary depending upon the particular conditions employed but in most instances the reaction is complete in about 20 minutes to 18 hours. Recovery of the desired product is readily effected employing convention techniques.

An alternate procedure for preparing compounds of Formula I involves the reaction of 2-(o-substituted aminobenzoyl)thiophene with ethyl carbamate in the presence of a Lewis acid, e.g., zinc chloride. This process is illustrated by the following reaction scheme:

Reaction scheme II

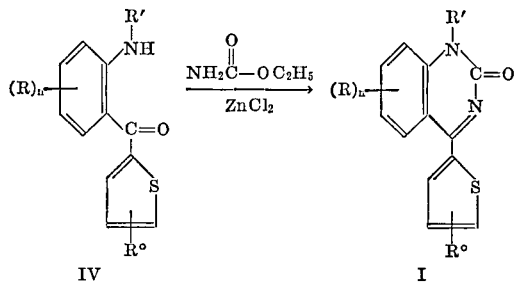

wherein R, n, R' and R° are as previously defined.

The reaction is conveniently carried out at elevated temperatures and in the presence of a catalytic amount of zinc chloride. Preferably, the reaction is effected at a temperature of from about 160° C. to about 200° C. If desired, the reaction may be carried out in the presence of a suitable inert organic solvent. However, the use of a solvent is not necessary since an excess of the carbamate can be used for this purpose. Depending upon the particular conditions employed the reaction time will generally vary from about 30 minutes to about 2 hours.

Those compounds of Formula I wherein R' is limited to methyl and R and R" are as defined, can also be prepared by oxidizing 4-(2-thienyl)-3,4-dihydroquinazoline or an appropriately substituted derivative thereof, to form the corresponding 4-(2-thienyl)quinazoline, treating the latter with a methyl halide to form the corresponding 1-methyl halide salt thereof, then reducing the latter to form the corresponding 1-methyl-4-(2-thienyl)-1,2,3,4-tetrahydroquinazoline and oxidizing the latter. This process is exemplified by reaction scheme III below:

Reaction scheme III

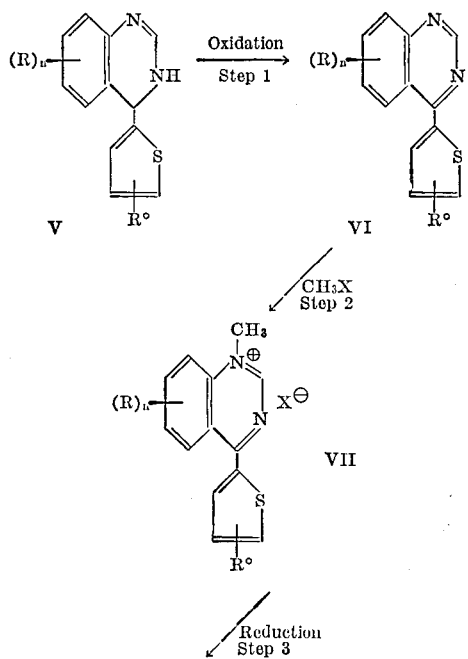

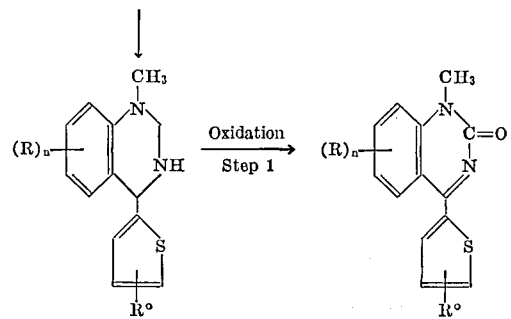

wherein X, R, n and R° are as previously defined.

The oxidation (Step 1) of the dihydroquinazoline (V) or tetrahydroquinazoline (VIII) is readily effected at room temperature and in the presence of any suitable inert organic solvent, e.g., dioxane and acetone. Preferably, the oxidation is carried out employing sodium or potassium permanganate. However, the oxidation of the dihydroquinazoline (V) can also be effected using sodium or potassium ferricyanide.

The reaction of the quinazoline (VI) with the methyl halide (Step 2) is carried out at room temperature or elevated temperatures up to about 45° C. employing either an excess of the halide reactant or a suitable inert organic solvent as the reaction medium. Preferably, the reaction is carried out at reflux temperature employing an excess of methyl iodide as the halide reactant. If desired, such reaction can be carried out in the presence of an inert organic solvent, e.g., tetrahydrofuran, dioxane, chloroform, benzene and the like. When the halide employed is a gas at ordinary room temperature, a suitable inert organic solvent is generally employed as the reaction medium.

The conversion of the quinazolinium halide (VII) to the corresponding tetrahydroquinazoline (VIII), as illustrated by Step 3, can be achieved by chemical reduction employing a suitable borohydride, e.g., sodium borohydride, as the reducing agent. The reduction is conveniently effected in a suitable organic solvent, e.g., a lower alkanol such as methanol and ethanol, or mixtures of lower alkanols with methylene chloride, chloroform or water.

The starting compounds employed in reaction scheme I are either known and can be prepared as described in the literature or can be prepared from available materials in analogous manner to that described in the literature for the preparation of the known compounds.

The starting compounds employed in reaction scheme II are prepared by reacting an o-(N-substituted-N-tosylamino)benzoyl chloride with thiophene or an appropriate derivative thereof to form the corresponding 2-[o-(N-substituted-N-tosylamino)benzoyl]thiophene and then treating the latter with an appropriate strong acid to remove the tosyl substituent and form the corresponding 2-(o-substituted aminobenzoyl thiophene. This process is illustrated as follows:

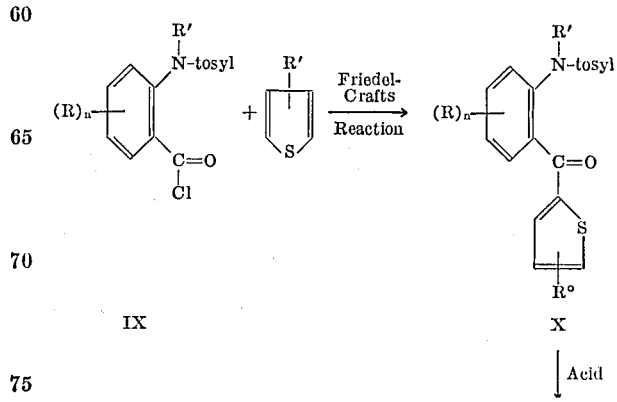

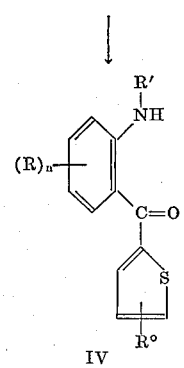

wherein R, n, R' and R° are as previously defined.

The reaction of the benzoyl chloride (IX) with thiophene is carried out employing the conventional Friedel-Crafts Reaction. Desirably, the reaction is carried out in an appropriate inert organic solvent, e.g., carbon disulfide, at room temperature or elevated temperatures of up to about 60° C. and in the presence of any of the usual Friedel-Crafts catalysts, e.g., aluminum chloride, zinc chloride, stannic chloride, phosphoric acid and the like. The benzoyl chloride reactant (IX) employed is either known and can be prepared as described in the literature or can be prepared from available materials in a manner analogous to that described in the literature for the preparation of the known compounds.

Conversion of the 2-[o-(N-substituted-N-tosylamino) benzoyl]thiophene (X) to the desired compound of Formula IV is conveniently effected by treating the former with a strong acid, preferably concentrated sulfuric acid, at room temperature. In addition to sulfuric acid other strong acids which are capable of removing a protective tosyl group, e.g., hydrobromic acid in acetic acid, can also be used.

The starting compounds employed in reaction scheme III are readily prepared by reacting quinazoline (or appropriate derivative thereof) with a metallo thiophene derivative such as an alkali metal thiophene, e.g., thienyl lithium and thienyl sodium, or a Grignard Reagent, e.g., thienyl magnesium bromide. This process is illustrated below:

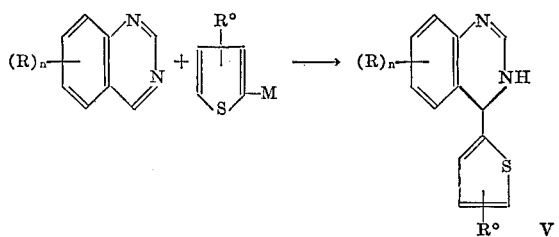

wherein R, n and R° are as previously defined, and M represents an alkali metal, preferably lithium or sodium, or a magnesium halide, preferably magnesium bromide or magnesium iodide.

The reaction is conveniently carried out in conventional manner employing a suitable inert organic solvent, e.g., diethyl ether and tetrahydrofuran, and a reaction temperature of from room temperature (20° C.) to about −40° C. depending upon the stability and reactivity of the thiophene reactant. Various of the reactants employed in the reaction are known and can be prepared as described in the literature. Such others which may not be specifically disclosed in the literature can be prepared from available material in analogous manner.

The compounds of structural Formula I are useful because they possess pharmacological activity in animals. In particular, the compounds are useful as anti-inflammatory agents. The compounds are also useful as antipyretics and analgesics. For such uses the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. The dosage administered will, of course, vary depending upon the compound employed, the therapy desired and the mode of administration. However, in general, satisfactory results are obtained when administered at a daily dosage or from about 3 milligrams per kilogram of body weight to about 150 milligrams per kilogram of body weight preferably given in divided doses, 2 to 4 times a day, or in sustained release form. For most mammals the total daily dosage is from about 200 milligrams to 1500 milligrams and for the larger mammals dosage forms suitable for internal administration comprise from about 50 milligrams to about 750 milligrams of the compound admixed with a solid or liquid pharmaceutical carrier or diluent. For the smaller domestic animals the dosage forms suitable for internal administration comprise from about 100 milligrams to about 800 milligrams of the compound in admixture with a solid or liquid pharmaceutical carrier or diluent.

A representative formulation is a tablet (prepared by standard tabletting techniques) and containing the following ingredients:

| Ingredient: | Parts by weight |
|---|---|
| 1-methyl-4-(2-thienyl)-2(1H)-quinazolone | 50 |
| Tragacanth | 2 |
| Lactose | 39.5 |
| Corn starch | 5 |
| Talcum | 3 |
| Magnesium stearate | 0.5 |

The following examples show representative compounds encompassed within the scope of this invention and the manner in which such compounds are prepared. However, it is to be understood that the examples are for purposes of illustration only.

EXAMPLE 1

1-ethyl-4-(2-thienyl)-2(1H)-quinazolone

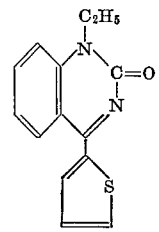

Step A: Preparation of 4-(2-thienyl)-2(1H)-quinazolone.—A mixture of 2.5 g. of 2-(o-aminobenzoyl)thiophene and 1.6 g. of urea is heated at 200° C. for 40 minutes. The resulting solid residue is filtered off, pulverized and then treated with 10 ml. of ethanol and 10 ml. of water. The solid residue thus obtained is filtered off and recrystallized from methanol to obtain 4-(2-thienyl)-2 (1H)-quinazolone, M.P. 254–257° C.

Step B: Preparation of 1-ethyl-4-(2-thienyl)-2(1H)-quinazolone.—To a solution of 0.46 g. of 4-(2-thienyl)-2(1H)-quinazolone in 10 ml. of dimethylacetamide is added 0.13 g. of sodium methoxide. The resulting mixture is stirred for 20 minutes at room temperature and then 0.2 ml. of ethyl iodide is added. The resulting mixture is stirred at room temperature until the pH of the mixture is 7–8 (20–30 minutes) and then diluted with 50 ml. of water. The diluted mixture is then extracted with a total of 100 ml. of methylene chloride and the organic phase dried over anhydrous sodium sulfate and evaporated. The residue is chromatographed on an aluminum oxide column, and the resulting product crystallized from acetone to obtain 1-ethyl-4-(2-thienyl)-2(1H)-quinazolone, M.P. 157–158° C.

EXAMPLE 2

1-methyl-4-(2-thienyl)-2(1H)-quinazolone

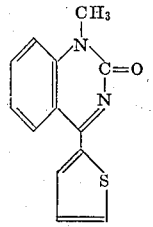

Step A: Preparation of 2-[o-(N-methyl-N-tosylamino) benzoyl]thiophene.—To a solution of 10.6 g. of o-(N-methyl-N-tosylamino)benzoyl chloride and 10 ml. of thiophene in 300 ml. of carbon disulfide is added, portionwise, 14 g. of aluminum chloride. The resulting mixture is then allowed to stand at room temperature for 30 minutes, and the carbon disulfide is then decanted off. To the residue is added 200 ml. of a mixture of ice and water. The aqueous phase is then extracted three times with 100 ml. (each) of chloroform, and the combined chloroform extracts washed with 100 ml. of a saturated sodium bicarbonate solution, then dried over anhydrous sodium sulfate, filtered and evaporated to dryness in vacuo. The residue is chromatographed on an aluminum oxide column to obtain 2-[o-(N-methyl-N-tosylamino) benzoyl]thiophene as a yellow oil.

Step B: Preparation of 2-(o-methylaminobenzoyl)thiophene.—A solution of 10 g. of 2-[o-(N-methyl-N-tosylamino)benzoyl]thiophene in 150 ml. of concentrated sulfuric acid is allowed to stand at room temperature for 4 hours and then poured over 500 ml. of a mixture of ice and water. The thus-obtained solution is then made alkaline with 50% sodium hydroxide to pH 9. The resulting mixture is then extracted with a total of 500 ml. of methylene chloride to obtain 2-(o-methylaminobenzoyl)thiophene as a yellow oil.

Step C: Preparation of 1-methyl-4-(2-thienyl)-2(1H)-quinazolone.—A mixture of 0.9 g. of 2-(o-methylaminobenzoyl)thiophene, 1.8 g. of urethane and 25 mg. of zinc chloride is heated at 180° to 190° C. for 1½ hours. After cooling the resulting mixture to room temperature, 10 ml. of ethanol and 20 ml. of water are added and the mixture filtered. The crystalline residue thus obtained is recrystallized from ethyl acetate to obtain 1-methyl-4-(2-thienyl)-2(1H)-quinazolone, M.P. 149–150° C.

EXAMPLE 3

1-methyl-4-(2-thienyl)-2-(1H)-quinazolone (alternate method)

Step. A: Preparation of 4-(2-thienyl)-3,4-dihydroquinazoline.—A mixture of 8.4 g. of freshly distilled thiophene in 100 ml. of diethyl ether and 68 ml. of 1.6 N solution of butyl lithium in hexane is refluxed for 4 hours and then cooled to —30° C. To the cooled mixture is added, dropwise, while stirring a solution of 13 g. of quinazoline in 100 ml. of diethyl ether over a period of 5 to 10 minutes. The mixture is stirred for an additional 1½ hours while permitting the reaction temperature to rise to 0° C. and then 200 ml. of ice-cold water is added. The organic phase is then separated, the aqueous phase extracted twice with 500 ml. (each) of methylene chloride, and the combined organic phases dried over anhydrous sodium sulfate and then evaporated to dryness in vacuo. The residue thus obtained is recrystallized from ethyl acetate to obtain 4-(2-thienyl)-3,4-dihydroquinazoline, M.P. 169–171° C.

Step B: Preparation of 4 - (2 - thienyl)-quinazolone.—To a solution of 7.94 g. of 4-(2-thienyl)-3,4-dihydroquinazoline in 400 ml. of dry dioxane is added, dropwise, with stirring and at room temperature, 81 ml. of an aqueous solution of potassium permanganate (5.27 g. per 100 ml.). A few drops of formic acid are then added to destroy any excess permanganate and the mixture then filtered and the filtrate evaporated almost to dryness in vacuo. The residue thus obtained is added to a mixture of 200 ml. of methylene chloride and 200 ml. of water. The organic phase is separated, dried over anhydrous sodium sulfate and evaporated. The residue is crystallized from low-boiling petroleum ether to obtain 4-(2-thienyl)-quinazoline, M.P. 65–66° C.

Step C: Preparation of 1 - methyl - 4 - (2-thienyl)-quinazolinium iodide.—A solution of 37 g. of 4-(2-thienyl)quinazoline in 40 ml. of methyl iodide is refluxed for 15 hours and then diluted with 100 ml. of ethyl acetate. The residue is filtered off to obtain 1-methyl-4-(2-thienyl)-quinazolinium iodide, M.P. 210–220° C.

Step D: Preparation of 1 - methyl - 4 - (2-thienyl)-1,2,3,4 - tetrahydroquinazoline.—To a solution of 55 g. of 1 - methyl - 4 - (2-thienyl)-quinazolinium iodide in 1000 ml. of ethanol and 200 ml. of methylene chloride is added, in small portions over a period of 5 minutes, 20 g. of sodium borohydride. The resulting mixture is stirred for ½ hour at room temperature and then acidified by careful addition of 200 ml. of 2 N hydrochloric acid. The acidified mixture is then concentrated in vacuo to about 150 ml. and then 200 m. of 2 N sodium hydroxide is added. The aqueous phase is then extracted three times with 150 ml. (each) of methylene chloride and the combined methylene chloride extracts dried over anhydrous sodium sulfate, filtered and evaporated in vacuo to obtain 1 - methyl - 4 - (2-thienyl)-1,2,3,4-tetrahydroquinazoline as a yellow oil.

Step E: Preparation of 1 - methyl - 4 - (2-thienyl)-2-(1H) - quinazolone.—To a solution of 33 g. of 1-methyl-4 - (2 - thienyl) - 1,2,3,4-tetrahydroquinazoline in 1600 ml. of dry dioxane is added dropwise, with stirring and at room temperature, 800 ml. of an aqueous solution of potassium permanganate (52.7 g./1000 ml.). A few drops of formic acid are then added to destroy any excess permanganate, the mixture then filtered and the filtrate concentrated to about 200 ml. in vacuo. to the material thus obtained is added 300 ml. of water. The crystalline product which forms is filtered off to obtain 1-methyl-4-(2-thienyl) - 2(1H) - quinazolone, M.P. 149–150° C.

EXAMPLE 4

6-chloro-1-methyl-4-(2-thienyl)-2(1H)quinazolone

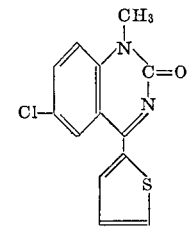

Step A: Preparation of 6 - chloro - 4 - (2-thienyl)-3,4-dihydroquinazoline.—A mixture of 10 ml. of thiophene in 150 ml. of diethyl ether and 86 ml. of a 1.6 molar solution of n-butyllithium in hexane is refluxed for 4 hours. The resulting solution is cooled to 0° C., and then a solution of 20 g. of 6-chloroquinazoline in 250 ml. of benzene is added dropwise while stirring. The resulting mixture is stirred for an additional hour at room temperature and then 500 ml. of water is added. The organic phase is separated, and the aqueous phase extracted twice with 100 ml. (each) of methylene chloride. The combined organic phases are dried over anhydrous sodium sulfate, filtered and the filtrate evaporated to dryness in vacuo. The residue is crystallized from ethyl acetate to obtain 6 - chloro - 4 - (2-thienyl)-3,4-dihydroquinazoline, M.P. 160–161° C.

Step B: Preparation of 6 - chloro - 4 - (2-thienyl)-quinazoline.—To a solution of 13 g. of 6 - chloro-4-(2-thienyl)-3,4 - dihydroquinazoline in 500 ml of dioxane is added dropwise, with stirring and at room temperature, 116 ml. of an aqueous solution of potassium permanganate (5.27 g. per 100 ml.). A few drops of formic acid are then added to destroy any excess permanganate, the mixture then filtered and the filtrate evaporated almost to dryness in vacuo. The residue thus obtained is added to a mixture of 200 ml. of methylene chloride and 200 ml. of water. The organic phase is separated, dried over anhydrous sodium sulfate and evaporated. The residue is crystallized from diethyl ether to obtain 6 - chloro-4-(2-thienyl)-quinazoline, M.P. 125–126° C.

Step C: Preparation of 6-chloro-1-methyl-4-(2-thienyl)-quinazolium iodide.—A solution of 11.5 g. of 6-chloro-4-(2-thienyl)-quinazoline in 30 ml. of methyl iodide is refluxed for 24 hours and then diluted with 100 ml. of ethyl acetate. The residue is filtered off to obtain 6-chloro-1-methyl-4-(2-thienyl)-quinazolium iodide.

Step D: Preparation of 6 - chloro - 1 - methyl-4-(2-thienyl) - 1,2,3,4 - tetrahydroquinazoline.—To a solution of 6.1 g. of 6 - chloro - 1 - methyl-4-(2-thienyl)-quinazolinium iodide in 100 ml. of ethanol and 100 ml. of methylene chloride is added, in small portions over a period of 5 minutes, 3.0 g. of sodium borohydride. The resulting mixture is stirred for ½ hour at room temperature and then acidified by careful addition of 200 ml. of 2 N hydrochloric acid. The acidified mixture is then concentrated in vacuo to about 150 ml. and then 200 ml. of 2 N sodium hydroxide is added. The aqueous phase is then extracted three times with 100 ml. (each) of methylene chloride, the combined methylene chloride extracts dried over anhydrous sodium sulfate, filtered and evaporated in vacuo to obtain 6 - chloro - 1 - methyl-4-(2-thienyl) - 1,2,3,4-tetrahydroquinazoline as a yellow oil.

Step E: Preparation of 6 - chloro - 1 - methyl-4-(2-thienyl) - 2(1H)quinazolone.—To a solution of 3.5 g. of 6 - chloro - 1 - methyl-4-(2-thienyl)-1,2,3,4-tetrahydroquinazoline in 200 ml. of dry dioxane is added dropwise, with stirring and at room temperature, 75 ml. of an aqueous solution of potassium permanganate (5.27 g./100 ml.). A few drops of formic acid are then added to destroy any excess permanganate, the mixture then filtered and the filtrate concentrated to about 50 ml. in vacuo. To the resultant is added 50 ml. of water. The solid material thus obtained is filtered off and recrystallized from ethyl acetate to obtain 6 - chloro - 1 - methyl-4-(2-thienyl)-2(1H)-quinazolone, M.P. 208° C.

EXAMPLE 5

1-methyl-4-(5-methyl-2-thienyl)-2(1H)-quinazolone

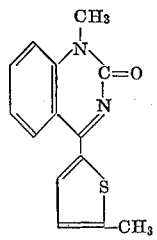

Step A: Preparation of 4-(5-methyl-2-thienyl)-3,4-dihydroquinazoline.—A mixture of 7.5 g. of 2-methylthiophene in 150 ml. of diethyl ether and 53 ml. of 1.6 N solution of butyl lithium in hexane is refluxed for 4 hours and then cooled to —40° C. To the cooled mixture is added dropwise while stirring a solution of 10 g. of quinazoline in 50 ml. of diethyl ether over a period of 5 to 10 minutes. The mixture is stirred for an additional 1½ hours while permitting the reaction temperature to rise to 0° C., and then 200 ml. of ice-cold water is added. The organic phase is then separated, the aqueous phase extracted twice with 100 ml. (each) of methylene chloride and the combined organic phases dried over anhydrous sodium sulfate and then evaporated to dryness in vacuo. The residue thus obtained is crystallized from ethyl acetate to obtain 4 - (5 - methyl-2-thienyl)-3,4-dihydroquinazoline, M.P. 140–141° C.

Step B: Preparation of 4-(5-methyl - 2 - thienyl)-quinazoline.— To a solution of 10.6 g. of 4-(5-methyl-2-thienyl)-3,4-dihydroquinazoline in 400 ml. of dry dioxane is added dropwise, with stirring and at room temperature, 102 ml. of an aqueous solution of potassium permanganate (5.27 g./100 ml.). A few drops of formic acid are then added to destroy any excess permanganate, the mixture is then filtered and the filtrate evaporated almost to dryness in vacuo. The residue thus obtained is added to a mixture of 200 ml. of methylene chloride and 200 ml. of water. The organic phase is separated, dried over anhydrous sodium sulfate and evaporated to obtain 4-(5-methyl-2-thienyl)-quinazoline as a yellow oil.

Step C: Preparation of 1-methyl-4-(5-methyl-2-thienyl)-quinazolinium oxide.—A solution of 9.3 g. of 4-(5-methyl-2-thienyl)-quinazoline in 20 ml. of methyl iodide is refluxed for 16 hours. The excess methyl iodide is evaporated off, the residue refluxed with 100 ml. of acetone and the resulting solid material filtered to obtain 1-methyl-4-(5-methyl-2-thienyl)-quinazolinium iodide.

Step D: Preparation of 1-methyl-4-(5-methyl-2-thienyl)-1,2,3,4-tetrahydroquinazoline.—To a solution of 14.6 g. of 1-methyl-4-(5-methyl - 2 - thienyl) - quinazolinium iodide in 200 ml. of ethanol and 200 ml. of methylene chloride is added, in small portions over a period of 5 minutes, 7 g. of sodium borohydride. The resulting mixture is stirred for ½ hour at room temperature and then acidified by careful addition of 200 ml. of 2 N hydrochloric acid. The acidified mixture is then concentrated in vacuo to about 150 ml. and then 200 ml. of 2 N sodium hydroxide is added. The aqueous phase is then extracted three times with 100 ml. (each) of methylene chloride and the combined methylene chloride extracts dried over anhydrous sodium sulphate, filtered and evaporated in vacuo to obtain 1-methyl-4-(5-methyl-2-thienyl)-1,2,3,4-tetrahydroquinazoline as a yellow oil.

Step E: Preparation of 1-methyl-4-(5-methyl-2-thienyl)-2(1H)-quinazolone.—To a solution of 10 g. of 1-methyl-4-(5-methyl-2-thienyl) - 1,2,3,4 - tetrahydroquinazoline in 400 ml. of dry dioxane is added dropwise, with stirring and at room temperature, 180 ml. of an aqueous solution of potassium permanganate (5.27 g./100 ml.). A few drops of formic acid are then added to destroy any excess permanganate and the mixture then filtered and the filtrate concentrated to about 50 ml. in vacuo. To the material thus obtained is added 50 ml. of water. The crystalline product which forms is filtered off and recrystallized from ethyl acetate/diethyl ether (1:1) to obtain 1-methyl-4-(5-methyl - 2 thienyl) - 2(1H) - quinazolone, M.P. 104–106° C.

EXAMPLE 6

1-propyl-4-(2-thienyl)-2(1H)-quinazolone

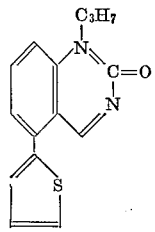

To a solution of 0.46 g. of 4-(2-thienyl)-2(1H)-quinazolone in 10 ml. of dimethylacetamide is added 0.13 g. of sodium methoxide. The resulting mixture is stirred for 20 minutes at room temperature and then 0.25 ml. of n-propyl iodide is added. The resulting mixture is stirred at room temperature until the pH of the mixture is 7–8 and then diluted with 50 ml. of water. The diluted mixture is then extracted with a total of 100 ml. of methylene chloride and the organic phase dried over anhydrous sodium sulfate and evaporated. The residue is chromatographed on an aluminum oxide column, and the resulting product crystallized from diethyl ether/hexane (2:1) to obtain 1-propyl-4-(2 - thienyl) - 2(1H)-quinazolone, M.P. 97° C.

EXAMPLE 7

1-methyl-4-(4-methyl-2-thienyl)-2(1H)-quinazolone

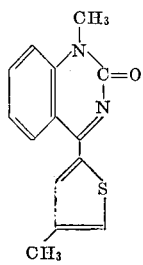

Step A: Preparation of 4-(4-methyl-2-thienyl)-3,4-dihydroquinazoline.—A mixture of 7.5 g. of 3-methylthiophene in 150 ml. of diethyl ether and 53 ml. of a 1.6 N solution of butyl lithium in hexane is refluxed for 4 hours and then cooled to −40° C. To the cooled mixture is added dropwise while stirring a solution of 10 g. of quinazoline in 50 ml. of diethyl ether over a period of 5 to 10 minutes. The mixture is stirred for an additional 1½ hours while permitting the reaction temperature to rise to 0° and then 200 ml. of ice-cold water is added. The organic phase is then separated, the aqueous phase extracted twice with 100 ml. (each) of methylene chloride and the combined organic phases dried over anhydrous sodium sulfate and then evaporated to dryness in vacuo to obtain 4 - (4-methyl-2-thienyl)-3,4-dihydroquinazoline as a yellow oil. The bi-maleate salt thereof, M.P. 189–193° C., is obtained by treatment of an acetone solution of the base with maleic acid.

Step B: Preparation of 4-(4 - methyl-2-thienyl)-quinazoline.—To a solution of 15.2 g. of 4-(4-methyl-2-thienyl)-3,4-dihydroquinazoline in 500 ml. of dry dioxane is added dropwise, with stirring and at room temperature, 135 ml. of an aqueous solution of potassium permanganate (5.27 g./100 ml.). A few drops of formic acid are then added to destroy any excess permanganate, the mixture is then filtered and the filtrate evaporated almost to dryness in vacuo. The residue thus obtained is added to a mixture of 200 ml. of methylene chloride and 200 ml. of water. The organic phase is separated, dried over anhydrous sodium sulfate and evaporated. The residue is crystallized from ethyl acetate to obtain 4-(4-methyl-2-thienyl)-quinazoline, M.P. 84–86° C.

Step C: Preparation of 1-methyl-4-(4-methyl-2-thienyl-quinazolinium iodide.—A solution of 11.0 g. of 4-(4-methyl-2-thienyl)-quinazoline in 20 ml. of methyl iodide is refluxed for 16 hours. The excess methyl iodide is evaporated off, the residue refluxed with 100 ml. of methanol and the resulting solid material recovered by filtration to obtain 1-methyl-4-(4-methyl-2-thienyl)-quinazolinium iodide of indefinite melting point.

Step D: Preparation of 1-methyl-4-(4-methyl-2-thienyl)-1,2,3,4-tetrahydroquinazoline.—To a solution of 14 g. of 1-methyl-4-(4-methyl-2-thienyl)-quinazolinium iodide in 300 ml. of ethanol and 100 ml. of methylene chloride is added, in small portions over a period of 5 minutes, 7 g. of sodium borohydride. The resulting mixture is stirred for ½ hour at room temperature and then acidified by careful addition of 200 ml. of 2 N hydrochloric acid. The acidified mixture is then concentrated in vacuo to about 150 ml. and then 200 ml. of 2 N sodium hydroxide is added. The aqueous phase is then extracted three times with 100 ml. (each) of methylene chloride and the combined methylene chloride extracts dried over anhydrous sodium sulfate, filtered and evaporated in vacuo to obtain 1 - methyl - 4 - (4-methyl-2-thienyl)-1,2,3,4-tetrahydroquinazoline as a yellow oil.

Step E: Preparation of 1-methyl-4-(4-methyl-2-thienyl)-2(1H)-quinazolone.—To a solution of 10 g. of 1-methyl-4 - (4 - methyl - 2-thienyl)-1,2,3,4-tetrahydroquinazoline in 400 ml. of dry dioxane is added dropwise, with stirring and at room temperature, 180 ml. of an aqueous solution of potassium permanganate (5.27 g./100 ml.). A few drops of formic acid are then added to destroy any excess permanganate and the mixture then filtered and the filtrate concentrated to about 50 ml. in vacuo. To the material thus obtained is added 50 ml. of water. The resulting solid product is filtered off and crystallized from methanol to obtain 1 - methyl - 4 - (4 - methyl - 2-thienyl)-2(1H)-quinazolone, M.P. 248–250° C.

EXAMPLE 8

1-allyl-4-(2-thienyl)-2(1H)-quinazolone

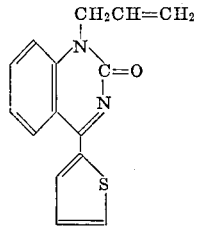

To a solution of 4.56 g. of 4-(2-thienyl)-2(1H)-quinazolone in 75 ml. of dimethylacetamide is added 1.5 g. of sodium methoxide. The resulting mixture is stirred for 30 minutes at room temperature and then 3 ml. of allyl iodide is added. The resulting mixture is stirred at room temperature until the pH of the mixture is 7–8, then the solvent is evaporated off in vacuo and the residue diluted with 50 ml. of water. The diluted mixture is then extracted with a total of 100 ml. of methylene chloride and the organic phase dried over anhydrous sodium sulfate and evaporated. The residue is crystallized from ethyl acetate to obtain 1-allyl-4-(2-thienyl)-2(1H)-quinazolone, M.P. 116–118° C.

EXAMPLE 9

1-propargyl-4-(2-thienyl)-2(1H)-quinazolone

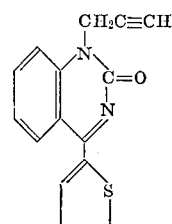

To a solution of 7 g. of 4-(2-thienyl-2(1H)-quinazolone in 125 ml. of dimethylacetamide is added 3.5 g. of sodium methoxide. The resulting mixture is stirred for 1 hour at room temperature and then 7 ml. of propargyl iodide is added. The resulting mixture is stirred at room temperature until the pH of the mixture is 7–8, then the solvent is evaporated off in vacuo and the residue diluted with 100 ml. of water. The diluted mixture is then extracted with a total of 150 ml. of methylene chloride and the organic phase dried over anhydrous sodium sulfate and evaporated. The residue is crystallized from ethyl acetate to obtain 1 - propargyl - 4 - (2-thienyl)-2(1H)-quinazolone, M.P. 207–208°C.

EXAMPLE 10

Following the procedure of Example 2 and employing the appropriate corresponding starting materials in approximately similar proportions there is prepared the following compounds of the invention:

(A) 1 - isopropyl - 4 - (2'- thienyl) - 2(1H) - quinazolone, M.P. 148–150° C. (Crystallization from ethyl acetate.)

(B) 1 - isopropyl - 7 - methyl - 4 - (2-thienyl)-2(1H)-quinazolone, M.P. 154–156° C. (Crystallization from acetate/diethyl ether.)

What is claimed is:

1. A compound of the formula

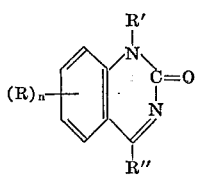

wherein
R is hydrogen, halo of atomic weight no greater than 80, lower alkyl or lower alkoxy;
n is 1 or 2;
R' is allyl, propargyl or lower amyl;
R" is

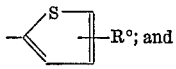

R° is hydrogen, halo of atomic weight no greater than 36 or lower alkyl.

2. A compound of claim 1 wherein R' is lower alkyl, allyl or propargyl.
3. A compound of claim 1 in which R is hydrogen or halo, in which R° is hydrogen and in which n is 1.
4. A compound of claim 2 in which R' is allyl and R° is hydrogen.
5. A compound of claim 2 in which R' is propargyl.
6. A compound of claim 2 in which R' is alkyl.
7. A compound of claim 6 in which R' is methyl, ethyl or isopropyl.
8. A compound of claim 7 in which R° is hydrogen.
9. A compound of claim 8 in which R is halo.
10. A compound of claim 7 in which R is methyl or methoxy.
11. The compound of claim 9 which is 6-chloro-1-methyl-4-(2-thienyl)-2(1H)-quinazolone.
12. The compound of claim 10 which is 1-ethyl-4-(2-thienyl)-2(1H)-quinazolone.
13. The compound of claim 10 which is 1-methyl-4-(2-thienyl)-2(1H)-quinazolone.
14. The compound of claim 10 which is 1-isopropyl-4-(2-thienyl)-2(1H)-quinazolone.
15. The compound of claim 10 which is 1-isopropyl-7-methyl-4-(2-thienyl)-2(1H)-quinazolone.
16. A compound of the formula

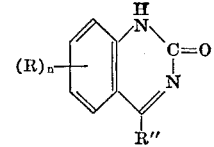

wherein
R is hydrogen, halo of atomic weight no greater than 80, lower alkyl or lower alkoxy;
n is 1 or 2;
R" is

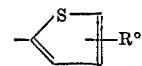

and
R° is hydrogen, halo of atomic weight no greater than 36 or lower alkyl.

References Cited
UNITED STATES PATENTS
3,452,041  6/1969  Bell et al. _____ 260—309.5

ALEX MAZEL, Primary Examiner
R. V. RUSH, Assistant Examiner

U.S. Cl. X.R.
260—577; 424—251

UNITED STATES PATENT OFFICE
CERTIFICATE OF CORRECTION

Patent No. 3,551,427   Dated December 29, 1970.

Inventor(s) Hans Ott

It is certified that error appears in the above-identified patent and that said Letters Patent are hereby corrected as shown below:

Column 13, Line 13, delete last word "amyl" and insert in lieu thereof --alkyl--.

Signed and sealed this 6th day of June 1972.

(SEAL)
Attest:

EDWARD M. FLETCHER, JR.
Attesting Officer

ROBERT GOTTSCHALK
Commissioner of Patents